Nov. 7, 1967

MASAYASU ARIKAWA ET AL 3,351,734

ELECTRIC ARC WORKING FOR WELDING ONE SIDE OF TWO PIECES OF STEEL PLATES

Filed Nov. 14, 1966

Masayasu Arikawa, Naoki Okuda and Motomi Kano : INVENTORS

BY Wenderoth, Lind & Ponack, Attorneys

United States Patent Office 3,351,734
Patented Nov. 7, 1967

3,351,734

ELECTRIC ARC WORKING FOR WELDING ONE SIDE OF TWO PIECES OF STEEL PLATES

Masayasu Arikawa, Fujisawa-shi, Naoki Okuda, Kamakura-shi, and Motomi Kano, Fujisawa-shi, Japan, assignors to Kobe Steel Ltd., Fukiai-ku, Kobe, Japan Filed Nov. 14, 1966, Ser. No. 594,235
Claims priority, application Japan, Nov. 15, 1965, 40/70,398
15 Claims. (Cl. 219—137)

ABSTRACT OF THE DISCLOSURE

A method of electric arc welding from only one side of two adjacent steel plates to be joined together in order to form a rippled bead on the other side of said steel plates, comprising placing a copper backing plate supporting a granular welding flux containing iron powder in an amount of from 10 to 75% by weight against the other side of said plates underneath the adjacent edges of the plates, and then electric arc welding the steel plates together at said adjacent edges by moving an electric arc along said edges from only the one side thereof.

The present invention relates to an improved method of electric arc welding for butt-welding of the adjacent ends of two steel plates to be joined together, and more particularly to an improved method of electric arc welding for butt-welding of the adjacent ends of two steel plates to be joined together so as to form a rippled bead on the back sides of the steel plates at the junction thereof.

It has been well known in the art that for butt-welding of steel plates the so-called one-side butt-welding method is advantageous over the so-called both-side butt-welding method. It has been also known that the so-called one-side-submerged arc welding may be carried out by the employment of either the so-called copper plate backing method or the so-called flux applying method. According to the copper plate backing method, generally a piece of copper plate having a groove formed on the upper surface is disposed underneath the junction between the adjacent ends of two pieces of plates to be joined together for receiving the falling molten metal in its groove and such molten metal which has been received in the groove then forms a weld bead underneath the junction of the plates. Such a bead formed by this copper plate backing method has a substantially uniform configuration, but this method has inherent disadvantages in that fins are formed adjacent to the bead and metal fusion is not satisfactory. Accordingly, the copper plate backing method is not yet completely acceptable as a practical butt-welding method. That is, since the molten metal which has fallen in the groove of the backing copper plate runs in advance of the moving wire electrode as the wire advances along the weld line, the molten metal is rapidly quenched and solidifies prematurely so as to clog the groove. As a result, the thickness of the weld is increased by the amount of the prematurely solidified metal within the backing plate groove. Furthermore, since the underside of the solidified metal is in firm adherence with the backing copper plate, the prematurely solidified metal cannot be re-melted under subsequent welding conditions and subsequent beads are successively formed on the top of each of the previously solidified metal layers leaving the prematurely solidified metal layers as non-fused portions which makes it impossible to obtain a sound weld. On the other hand, according to the flux applying-one-side-welding method, flux is applied against the underside of the junction between the adjacent ends of two steel plates to be joined together and the falling molten metal forms a weld bead at the point at which the flux is applied while forming slag on the surface of the bead, and accordingly, this method has no disadvantages such as formation of fins and poor fusion, but has a disadvantage in that the configuration of a bead formed by this method is quite irregular. One-side-automatic welding, submerged or gas-shielded, usually employs a Y-shaped groove as shown in FIGURE 1.

In order to easily obtain a reverse side bead by welding from the face side, the groove angle $\theta$ should be kept as wide as possible and the root length $gl$ as short as possible. This is due to the fact that low electric current can easily melt the plate down to the reverse side, but the cross section of the groove becomes wider than that of the groove in a one-pass welding method where welding is carried out on each side of the plate. Therefore, a Y-shaped groove consumes a great deal of welding material, takes a long time for welding and besides in the case of thick plates, a Y-shaped groove gives rise to shrinkage of the plate toward the side in which the groove is made. These defects have been the greatest hindrance to the adoption of one-side automatic welding. There have also been many studies on the effect of extending the root length $gl$. One idea is to promote penetration down to the reverse side by providing root gaps $l_1$ and $l_2$ as shown in FIGURE 6. However, this method has proved to be impractical because the cross section of the groove is not sufficiently small and maintenance of root gaps on a long butt joint is very difficult.

The present invention concerns an improved method of electric arc welding for welding one side of the plates to be welded to form a rippled bead on the other sides of the plates by an electric arc which can effectively eliminate the above defects inherent in the prior art electric arc welding methods while retaining the advantages of these prior art methods. When one side welding is performed with a copper backing plate or a grooved copper backing plate applied underneath the junction between the adjacent ends of two pieces to be joined together, a gap may be provided by bevelling the adjacent ends of two pieces to be joined together maintaining the ends in close contact with each other so as to form a V-shape or U-shape opening therebetween, by separating the adjacent ends of the pieces from each other so as to form an I-shape opening therebetween or by bevelling and separating the adjacent ends of the pieces so as to form a Y-shape or X-shape opening therebetween, and then the above grooved copper backing plate is applied against the underneath of the thus formed gap so that the copper backing is positioned underneath the above-mentioned gap. Granular flux containing iron powder in an amount range 10 to 75% by weight is previously placed in the backing plate groove and when flux is to be placed in the gap as well as in the backing plate groove, the gap is filled with the flux after the backing plate has been placed underneath the gap. Then the adjacent ends of the plates are welded together by filling the gap with molten metal through any of the so-called submerged arc welding, gas-shielded arc welding or bare arc welding methods while forming a rippled bead at the bottom of the gap.

In carrying out the electric arc welding by the method of the present invention, since the operation is initiated with the iron powder-containing flux placed under the gap of two pieces of plates, the falling molten metal will not run in advance of the wire electrode which is advancing along the weld line. And since the flux is present between the copper backing plate and the undersides of the plates to be joined together, even if there is any clearance between the backing plate and the undersides of the plates, the molten metal will not form fins. Moreover, if the flux to be employed in carrying out the present invention contains iron powder, the amount of slag which is generated from the flux can be optionally adjusted by changing the amount of iron powder to be included in the flux, and since the slag amount can be limited within a predetermined range, disadvantages such as undercuts and lack of bead thickness which would be produced in carrying out the prior art electric arc welding methods can be eliminated and a fine quality and uniform shape bead having few fins can be obtained. When the amount of iron powder in the flux is less than 10% by weight, the amount of slag generated from the flux will become excessive and the amount of molten metal which forms a bead for filling up the backing plate groove will become in sufficient resulting in formation of hollows or depressions in the weld metal, and accordingly, the flux to be employed in carrying out the novel electric arc working should contain iron powder in the amount of at least 10%. As the iron content amount increases over 10% by weight, the amount of slag generated from the flux decreases in proportion to the increasing amount of iron powder and a rippled bead containing a sufficient amount of weld metal is formed at the bottom of the gap. An amount of iron powder within the above mentioned range is advisable for stabilizing the arc and for obtaining a uniform rippled bead at the bottom of the gap. On the other hand, an amount of iron powder in excess of 75% by weight is unsatisfactory for the purpose of the present invention because a uniform shape and good quality bead having a bright surface cannot be formed at the bottom of the gap.

Accordingly, one object of the present invention is to provide an improved electric arc welding method for welding from only one side of plates to be joined together to provide a rippled bead on the other side of the plates which can effectively eliminate defects such as formation of fins and irregularity in bead configuration which have been seen in the performance of the prior art one side welding methods for joining steel plates together.

Another object of the present invention is to provide an improved electric arc welding method for welding one side of plates to be joined to provide a rippled bead on the other side of the plates which does not require any specific equipment and skill in the performance of the welding.

A further object of the present invention is to provide an improved electric arc one side butt-welding method which can easily attain desired effects by adjusting the amount of iron powder in the flux.

A further object of the present invention is to provide an improved one side automatic arc-welding method with an X-shaped groove in the steel plate which has a thickness more than 16 mm.

The above and other objects, features and attendant advantages of the present invention will become apparent to those skilled in the art from a reading of the following detailed explanation of the invention in conjunction with the accompanying drawings.

In the drawings.

In these figures, the identical and/or corresponding parts are indicated with the same numerals.

Figure 1:
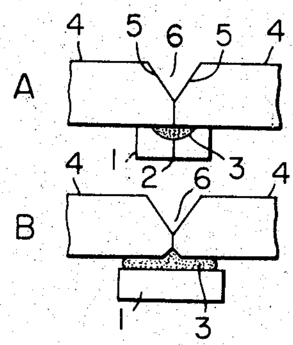
FIGS. 1A and 1B are schematic elevational views of a first arrangement of plates positioned for carrying out the method of the present invention.

Now referring to the figures of the accompanying drawings in which different arrangements for carrying out the method of the invention are schematically illustrated, in the arrangement of FIG. 1A the groove 2 of a copper backing plate 1 is initially filled with welding flux 3 and then two steel plates 4 and 4 whose adjacent end faces 5 and 5 are bevelled are placed on the backing plate with the end faces in close contact with each other so that the junction between the steel plates is centered over the groove 2 and the adjacent bevelled portions of the end faces form a V-shape groove 6 therebetween.

In FIG. 1B, a copper backing plate 1 which is not provided with a groove is utilized, flux 3 being placed between the upper surface of said plate 1 and the lower surfaces of two steel plates 4, 4.

Figure 2:
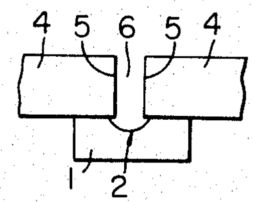
FIG. 2 is a schematic elevational view of a second arrangement of plates positioned for carrying out the method of the present invention.

In the arrangement of FIG. 2, the groove 2 of the copper backing plate 1 is initially filled with welding flux 3 in the same manner as in the case of the arrangement of FIG. 1, but the two steel plates 4 and 4 are not bevelled at their adjacent end faces 5 and 5, but have flat end faces and the opposite end faces are separated from each other whereby an I-shape gap 6 is formed therebetween.

Figure 3:
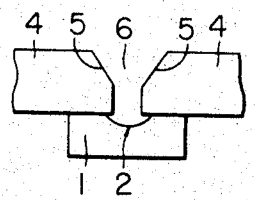
FIG. 3 is a schematic elevational view of a third arrangement of plates positioned for carrying out the method of the present invention.
Figure 4:
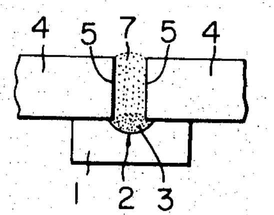
FIG. 4 is a view similar to FIG. 2, but illustrates an instance in which flux is placed both in the gap between plates to be joined together and the groove of a copper backing plate.

In the arrangement of FIG. 3, the groove 2 of a copper backing plate 1 is initially filled with welding flux as in the cases of FIGS. 1 and 2, but in the arrangement of FIG. 3 the adjacent end faces 5 and 5 of two steel plates 4 and 4 are bevelled and these steel plates are placed in spaced relation to each other on the copper backing plate 1 so that the adjacent end faces 5 and 5 of the steel plates form a Y-shape gap 6 therebetween. The arrangement of FIG. 4 is substantially the same as that of FIG. 2 except that welding flux is placed both in the backing plate groove 2 and the gap 6 between the adjacent end faces 5 and 5 of the steel plates 4 and 4. The flux within the gap 6 is shown by numeral 7. It should be understood that in any of the arrangements of FIGS. 1 through 4, the gap 6 is centered over the groove 2 of the backing copper plate 1. In carrying out the method of the present invention by the employment of any of the illustrated arrangements, an inert gas shielded arc, a carbon dioxide gas shielded arc or a bare arc may be introduced into the gap from above.

Figure 5:
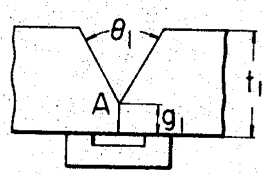
FIGS. 5, 6A–6B and 7 are schematic elevational views showing examples of the configuration of the gaps between plates for carrying out the method of the present invention.
Figure 6:
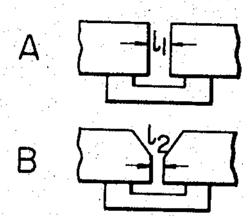
Figure 7:
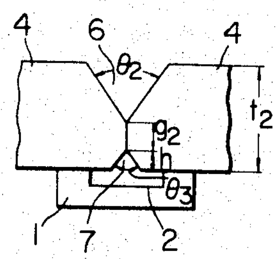

As shown in FIGURE 7 the present invention concerns a one-side automatic welding method which can obtain perfect penetration and can employ a narrow cross section groove by preparing groove 7 on the reverse side of the plates 4 from the Y-shaped groove 6 shown in FIGURE 7. In the usual groove as shown in FIGURE 5, $\theta_1$ is between 40° and 90° and $g_1$ is between 0 mm. and 4 mm. But in the groove employed by the present invention $\theta_2$ ranges from 30° to 90°, $g_2$ ranges from 0 mm. to 5 mm. and $h$ ranges from 2 mm. to 10 mm. Therefore, as the cross section of groove is extremely narrow, it is effective in the reduction of the amount of welding materials and prevention of welding strain. In the case of one side automatic welding of a Y-shaped groove as shown in FIGURE 1 by forming a bead on its reverse side, the depth of the groove ($t_1=g_1$) becomes so big that the root is melted down.

The power of the arc working upon a point A becomes weak even at constant current density because of its scattering on both surfaces of groove, therefore $\theta_1$ should be equal to or exceed 40° for a conventional current range to melt the root which has a length between 0 mm. and 4 mm.

For the same reason the root length should be equal to or exceed 4 mm. On the other hand, according to the method using the groove as shown in FIGURE 7 the groove depth of the face side ($t_2-g_2-h$) is smaller than that of FIGURE 5, while the arc power working upon the point A is stronger than that of FIGURE 5 because of a smaller scattering of arc on both surfaces of the groove at constant current density. Accordingly, groove angle $\theta_2$ can be proportionately smaller, and the root length $g_2$ can become larger.

In FIGURE 7 the groove on the reverse side has little effect upon penetration. It is appropriate that $\theta_3$ be between 30° and 120°, and $h$ be between 2 mm. and 10 mm.

In case $\theta_3$ is less than 30° molten metal solidifies before it fills the groove in the reverse side completely and a shortage of deposited metal sometimes occurs.

In case $\theta_3$ is greater than 120° the reverse bead cannot completely fill the groove and groove edges sometimes remain unfilled. In case $h$ is greater than 10 mm. a similar defect sometimes occurs as when $\theta_3$ is greater than above 40°, and the fact that groove $h$ is less than 2 mm. has little effect on the reduction of depth of the groove on the face of the plates.

Figure 8:
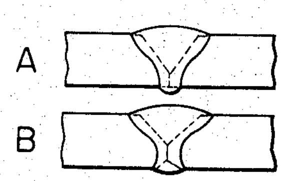
FIGS. 8A and 8B are a schematic elevational view showing the joined plates.

In the case of a conventional V-shaped groove or Y-shaped groove, especially with thick plates, the cross section of the groove becomes greater in proportion to the plate thickness, because of which consumption of welding materials increases, welding efficiency falls, and the plate is distorted by thermal-strain toward the side on which the groove is made. For example, when the cross section of a Y-shaped groove for one-side welding of a 32 mm. thick plate is compared with that of a standard X-shaped groove for one pass welding on each side of the plate with the same thickness, the former is 420 mm.$^2$ and the latter is 190 mm.$^2$; thus the former is 2.5 times as large in cross section as the latter. (Refer to FIGURE 8A and 8B). One-side welding with the use of a Y- or X-shaped groove, though it welds the plate from only one side of the plate and avoids a plate-turning-over process, is of little efficiency in the case of thick plates because of the three defects enumerated above. The present invention provides a solution to these three defects and the expansion of the scope of application of the one-side welding to thick plates. An example of such an application is described later in which where an X-shaped groove is used in the one-side welding, its cross section becomes almost as small as that of the X-shaped groove in the use of one pass welding on each side of the plates and 0.25 the cross section of the Y-shaped groove used in conventional one-side welding.

Hence, the consumption of welding materials decreases, welding efficiency is heightened, and also there exists little unbalance of the thermal-stress and consequently little strain since, with an X-shaped groove, the cross section of the weld metal is narrower on the face of the plates and is spread like an unfolded fan from the root toward the reverse side.

Furthermore, in the case of the conventional V-shaped groove, the maximum thickness of the plate that can be finished with one pass even by a tandem welding machine is 25 mm., while the present invention makes it possible to finish a 20 mm. thick plate with one pass welding by a single pole welding machine and 40 mm. thick plate by a tandem welding machine, using, in both cases, flux containing iron powder. That one pass finishing is possible adds very much to working efficiency in many ways; for instance in preparation of work, welding operation and removing slag. In the welding field where welding of 40 mm. thick or thinner plates is more than 90% of all welding, the present invention greatly increases working efficiency.

The following are examples in which the method of the present invention was successfully carried out.

*Example 1*

To steel plates each having a thickness of 12 mm. were disposed in spaced relation so that the adjacent ends of the steel plates formed an I-shaped gap of 7 mm., and then a copper backing plate having a groove which had a width of 14 mm., a depth of 3 mm. and a radius of curvature of 9 mm. was placed underneath the steel plates so that the gap was centered over the groove of the copper backing plate. Thereafter, both the gap and groove were filled with welding flux. The welding flux comprised by weight 20% of MgO, 9% of CaO, 10% of $Al_2O_3$, 5% of $SiO_2$, 4% of $CaF_2$, 2% of $Na_2O$, 46% of iron powder and 4% of deoxidizer. Submerged arc welding was performed under the following welding conditions: current of 900 amperes, voltage of 33 volts, welding rate of 35 cm./min. and wire electrode diameter of 6.4 mm. The results were that flow of molten metal within the backing plate groove in advance of the advancing movement of the wire along the weld line was prevented, the rippled bead formed at the bottom of the gap had a good appearance and was covered with slag of a suitable thickness, no undercuts and uneven spots were found, and fine quality deposit metal was obtained.

*Example 2*

Two steel plates having a thickness of 25 mm. were placed in spaced relation so that the adjacent ends of the steel plates formed an I-shaped gap of 9 mm. width and a copper backing plate identical with that employed in Example 1 was placed underneath the steel plates. Welding flux different from that employed in Example 1 was placed both in the gap and backing plate groove. The welding flux of this example comprised by weight 23% of $SiO_2$, 13% of $Al_2O_3$, 7% of CaO, 15% of MgO, 3% of $CaF_2$, 5% of $CaCO_3$, 3% of $Na_2O$, 25% of iron power and 6% of deoxidizer. Submerged welding was performed under the following welding conditions: current of 1300 amperes, voltage of 33 volts, welding rate of 22 cm./min., and wire electrode diameter of 6.4 mm. The results were the same as those by Example 1 and a good quality deposit metal was obtained.

*Example 3*

Two steel plates each having a thickness of 32 mm. and a bevelled end face of 5 mm. width were placed in end to end relation so that the adjacent bevelled ends were in contact with each other so as to form an included angle of 70° and a copper backing plate identical with those employed in Examples 1 and 2 was placed underneath the junction between the steel plates. Welding flux different from those employed in Examples 1 and 2 was previously placed in the groove of the backing plate prior to placing of the two steel plates on the backing plate. The welding flux comprised by weight 16% of $SiO_2$, 7% of CaO, 1% of $Al_2O_3$, 3% of MgO, 2% of $Na_2O$, 68% of iron powder and 3% of deoxidizer. Initially, carbon dioxide gas shielded arc first pass welding was performed under the following welding conditions: carbon dioxide gas flow of 20 l./min., current of 700 amperes, voltage of 44 volts, welding rate of 250 m./min. and wire electrode diameter of 200 mm. By this initial arc welding, a bead having a thickness of about 10 mm. was formed at the bottom of the junction of the steel plates. Thereafter, submerged arc welding was performed by use of welding flux comprising by weight 35% of MgO, 12% of CaO, 12% of $SiO_2$, 5% of MnO, 11% of $CaCO_3$, 7% of $CaF_2$, 4% of $Na_2O$ and 5% of deoxidizer. The welding conditions of the second pass submerged arc welding were current of 1350 amperes, voltage of 38 volts, welding rate of 18 cm./min. and wire electrode diameter of 6.4 mm. By these first and second pass welding operations, metal deposits having fine bead appearances were obtained both on the upper and lower surfaces of the steel plates at and in the vicinity of the welding line.

An example of an application of the present method is given below.

(1) Joint design—X-shaped groove (the same as in FIGURE 7)

(2) Cross section and necessary deposited mass (calculated from cross section); X-shaped groove—234 mm.$^2$ and 270 mm.$^2$ (3) Welding conditions:
X-shaped groove
First pass 1290A, 38 v., 38 cm./min.
Second pass 1230 A, 45 v. 38 cm./min.
Flux—One containing 39.4% of iron powder wire—US-43 (4.8 mm.$^\phi$)

It will be understood that minor changes and improvements may be made by those skilled in the art without departing from the scope and spirit of the invention, and accordingly, the invention is not to be limited to the precise examples described hereinabove, but only by the scope of the appended claims.

What is claimed is:

1. A method of electric arc welding from only one side of two adjacent steel plates to be joined together in order to form a rippled bead on the other side of said steel plates, comprising placing a copper backing plate supporting a granular welding flux containing iron powder in an amount of from 10 to 75% by weight against the other side of said plates underneath the adjacent edges of the plates, and then electric arc welding the steel plates together at said adjacent edges by moving an electric arc along said edges from only the one side thereof.

2. A method as claimed in claim 1, in which said adjacent edges of the steel plates are placed in contact with each other and are bevelled so as to provide a V-shape gap therebetween.

3. A method as claimed in claim 1, in which said adjacent edges of the steel plates are spaced from each other to provide an I-shape gap therebetween.

4. A method as claimed in claim 1, in which said adjacent edges of the steel plates are bevelled and spaced from each other to provide a Y-shape gap therebetween.

5. A method as claimed in claim 1, in which said adjacent edges of the steel plates are placed in contact with each other and are bevelled to provide an X-shape gap therebetween.

6. A method as claimed in claim 1, in which the copper backing plate has a groove therein in which said welding flux is placed prior to placing the backing plate against the plates to be welded.

7. A method as claimed in claim 1, in which said welding flux comprises, by weight, 23% $SiO_2$, 13% $Al_2O_3$, 7% CaO, 15% MgO, 3% $CaF_2$, 5% $CaCO_3$, 3% $Na_2O$, 25% iron powder and 6% deoxidizer.

8. A method as claimed in claim 1, in which said welding flux comprises, by weight, 5% $SiO_2$, 10% $Al_2O_3$, 9% CaO, 20% MgO, 4% $CaF_2$, 2% $Na_2O$, 46% iron powder and 4% deoxidizer.

9. A method as claimed in claim 1, in which said electric arc is a submerged electric arc.

10. A method as claimed in claim 1 in which said electric arc is a gas shielded electric arc.

11. A method as claimed in claim 1 in which said electric arc is a bare electric arc.

12. A method of electric arc welding from only one side of two adjacent steel plates to be joined together in order to form a rippled bead on the other side of said steel plates, comprising the steps of bevelling the adjacent edges and then placing the edges adjacent to each other to form a Y-shaped gap therebetween, placing a copper backing plate supporting a granular welding flux containing iron powder in an amount of from 10 to 75% by weight against the other side of said plates underneath the adjacent edges of the plates, performing a first pass welding along said Y-shaped gap from only said one side of the plates with a carbon dioxide gas shielded arc so as to produce a bead at the bottom of said gap, placing a second flux on the weld formed by said first pass weld, and performing a second pass welding on said weld by a submerged arc so as to provide a bead on the top of said first weld and shielding the remainder of said Y-shaped gap.

13. A method as claimed in claim 12, in which said first flux comprises, by weight, 16% $SiO_2$, 7% CaO, 1% $Al_2O_3$, 3% MgO, 2% $Na_2O$, 68% iron powder, and 3% deoxidizer.

14. A method as claimed in claim 12, in which said second flux comprises, by weight, 35% MgO, 12% CaO, 21% $SiO_2$, 5% MnO, 11% $CaCO_3$, 7% $CaF_2$ 4% $Na_2O$, and 5% deoxidizer.

15. A method as claimed in claim 1 in which said plates are at least 16mm thick and said adjacent edges are bevelled to form an X-shaped groove with the following dimensions:

(1) groove angle on said one side—30°–90°
(2) groove angle on said other side—30°–120°
(3) root length 5 mm. max.
(4) depth of groove on said other side—2 mm.–10 mm.

References Cited

UNITED STATES PATENTS

| | | | |
|---|---|---|---|
| 1,655,930 | 1/1928 | Woolard | 219—137 |
| 2,145,009 | 1/1939 | Kier | 219—73 |
| 2,288,433 | 6/1942 | Boetcher et al. | 219—137 |
| 2,294,650 | 9/1942 | Bechtle | 219—137 |
| 2,326,865 | 8/1943 | Kennedy | 219—73 |
| 2,352,716 | 7/1944 | Jones | 219—137 |
| 2,751,478 | 6/1956 | Jackson et al. | 219—73 |
| 2,759,084 | 8/1956 | Jackson et al. | 219—73 |
| 3,197,604 | 7/1965 | Turbyville et al. | 219—73 |
| 3,253,121 | 5/1966 | Robbins | 219—137 |

RICHARD M. WOOD, *Primary Examiner.*